United States Patent [19]

Crutcher

[11] 4,403,869
[45] Sep. 13, 1983

[54] ELECTRO-OPTIC IDENTIFICTION CODE SYSTEM IN A TIMEPIECE

[75] Inventor: William C. Crutcher, Middlebury, Conn.

[73] Assignee: Timex Corporation, Waterbury, Conn.

[21] Appl. No.: 179,383

[22] Filed: Aug. 18, 1980

[51] Int. Cl.³ ..................... G04B 47/00; G04C 17/00
[52] U.S. Cl. ....................................... 368/10; 368/239
[58] Field of Search ................................. 368/46–52, 368/55–58, 82–84, 155, 156, 200–202, 239–242, 10; 73/6

[56] References Cited

U.S. PATENT DOCUMENTS

| | | | |
|---|---|---|---|
| 3,938,317 | 2/1976 | Spano | 368/230 |
| 3,946,591 | 3/1976 | Yanagawa et al. | 73/6 |
| 3,978,322 | 8/1976 | Dobkin | 73/6 |
| 4,030,338 | 6/1977 | Ebihara | 73/6 |
| 4,130,738 | 12/1978 | Sandstedt | 179/2 DP |
| 4,282,594 | 8/1981 | Ichikawa | 368/82 |

*Primary Examiner*—Vit W. Miska
*Attorney, Agent, or Firm*—William C. Crutcher

[57] ABSTRACT

A combination timepiece and electro-optic identification code device employs elements of the timekeeping display and has a programmable read only memory (PROM) storing a number of identification codes with means for selecting the code and transmitting it from the memory via an electro-optic display portion on the timekeeping display to an opto-electronic reader placed in proximity with the timepiece. The code selected may be unique to the device itself, may be selected by the user, and be a machine-readable code representative of the time, or may be a combination of any of the above codes.

6 Claims, 23 Drawing Figures

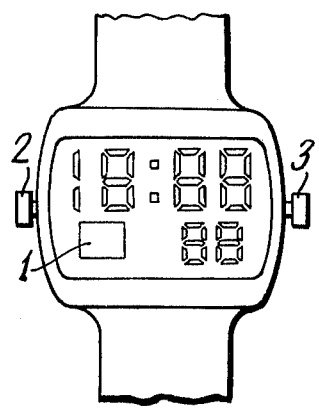
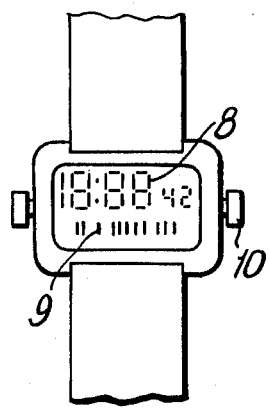
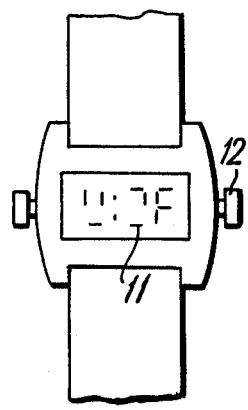
FIG.1  FIG.2  FIG.3  FIG.4
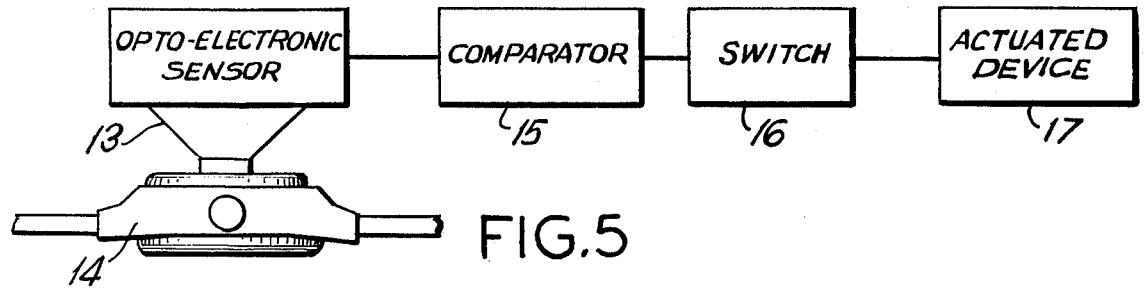
FIG.5
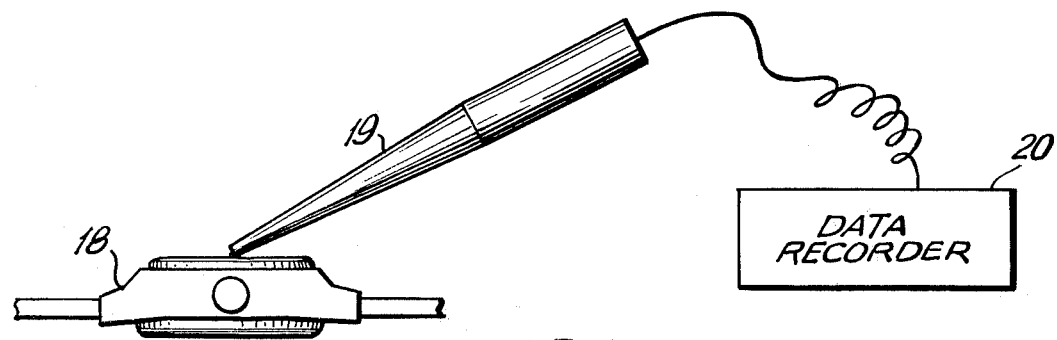
FIG.6
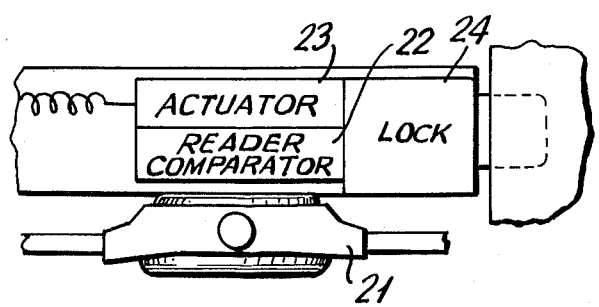
FIG.7

FIG.11
FIG.12
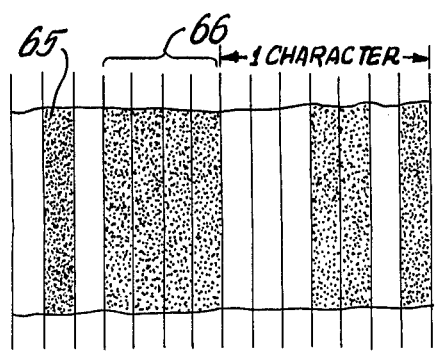
FIG.13a
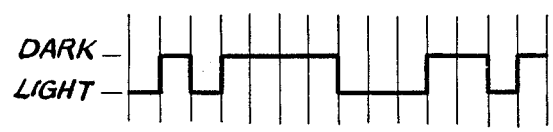
FIG.13b
FIG.13c

ELECTRO-OPTIC IDENTIFICTION CODE SYSTEM IN A TIMEPIECE

BACKGROUND OF THE INVENTION

This invention relates to an electro-optic identification code device incorporated in a timepiece which, when utilized with an opto-electronic reader provides a wrist instrument generating machine-readable codes from an electro-optic display associated with the timekeeping display. Such a wrist instrument can substitute for other types of personal identification devices, such as a key, magnetic card or identification badge.

Watches have evolved from mechanical escapement devices into highly accurate electronic devices incorporating an integrated circuit with oscillator and countdown divider controlled by a quartz crystal. The timekeeping display of a modern quartz watch may either be in the form of a solid state electro-optic display such as liquid crystal display (LCD), light-emitting diode (LED), electro-chromic (EC). The time may be shown in digits, or may be presented with conventional hands, in a quartz analog (QA) watch, driven by a stepping motor from the integrated circuit. The integrated circuits have become more and more complex and capable of multi-function timekeeping, incorporating a programmable logic arrays (PLA) to address a random access memory (RAM) storing and incrementing the time information under the control of a program in a read only memory (ROM). The memory capacity of integrated circuits has continually been improved, increasing the possibilities of other functions in a timepiece. Such a timepiece is illustrated in U.S. Pat. No. 4,063,409-Bayliss issued Dec. 20, 1977 and assigned by Intel Corporation to the present assignee.

Identification systems have been proposed previously in wristwatches employing coupling by means of radio waves between a data identification wristwatch and a testing station in U.S. Pat. No. 3,806,874 issued Apr. 23, 1974 to K. Ehrat. In th Ehrat patent, various types of identification codes are transmitted to identify the wearer of the wrist instrument. One alternative suggested for problems of security from detection of radio transmissions consists of direct connection of the identification unit to the testing station.

Opto-electronic coupling is well-known for providing electrical noise isolation in data communications. Code transmission using modulated light sources has also been suggested in connection with locks in lieu of a conventional mechanical key. For example, U.S. Pat. No. 3,845,362 issued Oct. 29, 1974 to Roe and U.S. Pat. No. 3,872,435 issued Mar. 18, 1975 to Cestaro employ electro-optic pulse trains from LED or other light sources to compare the pulses to a pattern which, if coincidence occurs, allows the lock to be opened. U.S. Pat. No. 4,130,738 issued Dec. 19, 1978 to Sandstedt describes a wristwatch used in conjunction with a telephone hand set adapted for coupling the two devices for data transmission. One of the coupling alternatives includes electro-optic coupling.

Other types of security systems incorporating mechanical keys or magnetic cards, as well as electronic solid state memory elements are illustrated in the following U.S. Patents, which list is not represented as complete, but only exemplary:

U.S. Pat. No. 3,806,882 issued Apr. 23, 1974 to Clarke
U.S. Pat. No. 3,848,229 issued Nov. 12, 1974 to Perron et. al.
U.S. Pat. No. 3,859,634 issued Jan. 7, 1975 to Perron et. al.
U.S. Pat. No. 3,754,214 issued Aug. 21, 1973 to Matsumoto et. al.
U.S. Pat. No. 3,934,122 issued Jan. 20, 1976 to Riccitelli Ordinarily the time display on a watch is intelligible to the user in terms of presenting time information, but it is not presented in machine-readable format. For example, an identification code could be displayed in lieu of time of day upon a digital display. Reading the digits electronically would require special digits and a special optical character recognition (OCR) system to read the display. However, many simplifications in machine reading have been made using "bar code" readers which simply distinguish between the presence or absence of light or dark succession of printed lines and the width of the lines. A wand stroked across the coded pattern detects narrow or wide lines by the difference in time required to traverse the width. Commercially available "wands" associated with opto-electronic equipment read standard printed bar code symbols on products. Such codes include the Universal Product Code (UPC) on food products or Code 39 for industrial goods. It would be desirable to employ standard bar codes and commercially available opto-electronic readers to receive optically transmitted machine-readable codes from a wrist instrument for identification purposes.

Accordingly, one object of the present invention is to provide an improved identification device combined with a timepiece which provides machine-readable codes from a electro-optic display associated with the timekeeping display.

Another object of the invention is to provide an improved device for selecting an identification code form the memory in a timepiece and for transmitting to an opto-electronic receiver.

Another object of the invention is to provide an improved secure identification device incorporated in an electronic timepiece memory.

SUMMARY OF THE INVENTION

Briefly stated, the invention comprises the improvement in an electronic timepiece of the type having a timebase including an oscillator and countdown divider providing timing pulses, timekeeping means connected to said divider and periodically advanced by said pulses to keep time and to store time information, and means connected to the timekeeping means and adapted to visually display the time, the improvement comprising an electro-optic portion on said display actuatable between at least two optical states, memory means inside the timepiece storing a plurality of identification codes, means for selecting the code to be transmitted and indicating the selection on the timepiece display, and means for selectively transferring at least one identification code from said memory means to said electro-optic display portion and optically displaying said identification code in binary form on the electro-optic display portion.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIGS. 1, 2, 3 and 4 are plan views of various types of timepieces with electro-optic displays according to the present invention;

FIG. 5 is a side view of a timepiece with stationary opto-electronic sensor and comparator enabling a switch-actuated device;

FIG. 6 is a similar side view an opto-electronic wand reader illustrated in conjunction with a timepiece;

FIG. 7 is a simplified view of a lock mechanism actuated by such an electro-optic identification timepiece;

FIGS. 11 and 12 are illustrations of two standard types of bar codes in commercial use;

FIGS. 13a, 13b and 13c are enlarged schematic views of an optical code pattern associated with a particular bar code an optical waveform for transmitting same, and the binary code associated with same;

DESCRIPTION OF PREFERRED EMBODIMENT

Figure 8:
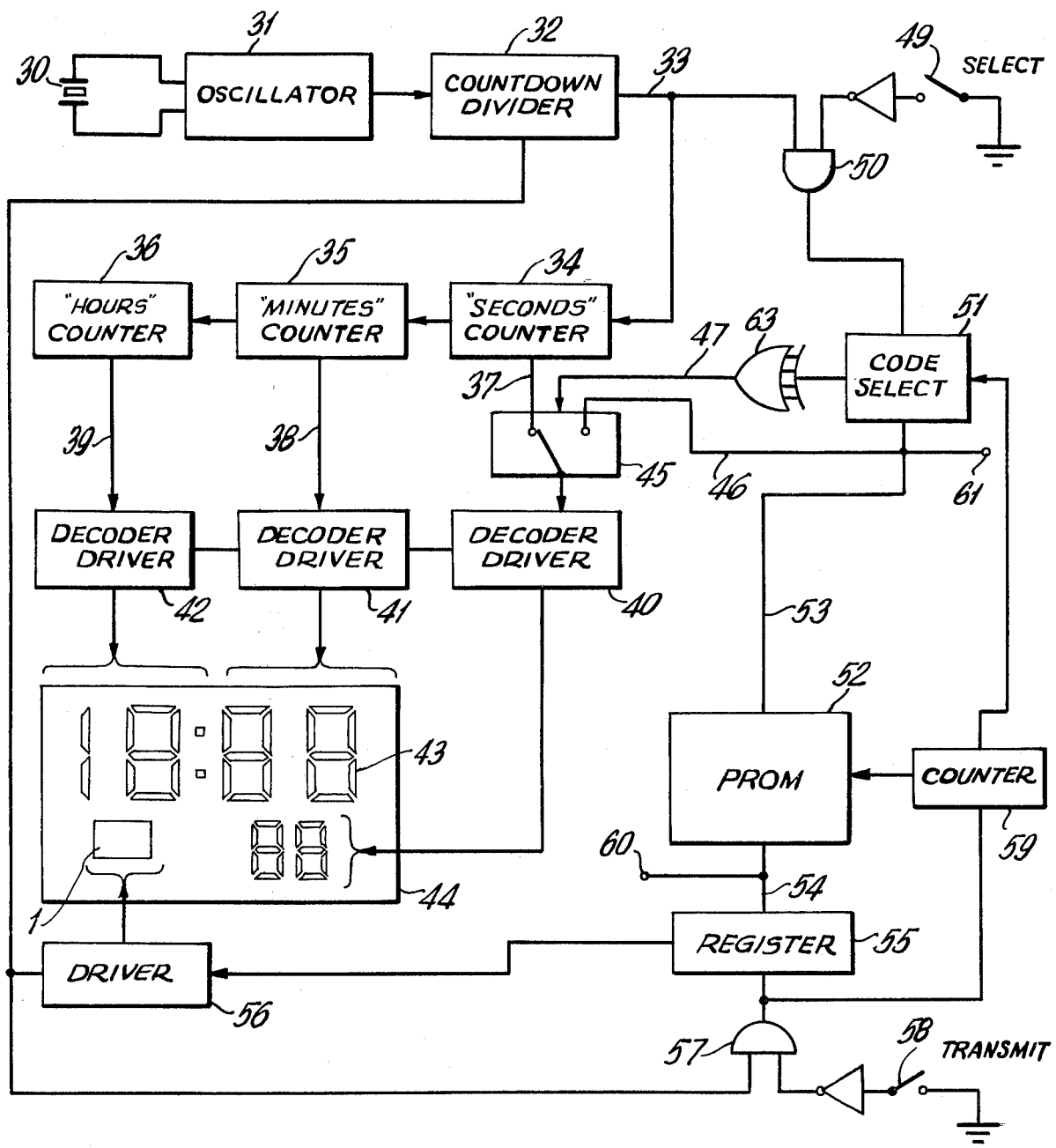
FIG. 8 is a simplified schematic logic diagram associated with the watch of FIG. 1.

Referring now to FIGS. 1-4 of the drawing, various types of timepieces are illustrated as wristwatches. FIG. 1 is a digital watch having a six-digit solid state display, preferably a liquid crystal display, which is substantially conventional in appearance except for having an added electro-optic display portion 1, which is controlled by push-buttons such as 2, 3 in accordance with the present invention.

FIG. 2 is a quartz analog watch conventional in appearance with hands 4 driven by a stepping-motor, but further including a code selection ring 5 and an electro-optic portion 6 in the timepiece dial, preferably an LED element and controlled by push-buttons such as 7.

FIG. 3 is a watch with a six-digit digital display 8 and further having a supplementary bar code display 9 controllable by push-buttons 10.

FIG. 4 is a digital watch with a conventional digital display, but which is transformable into a binary machine-readable display, illustrated as 11, in response to actuation of push-buttons such as 12.

FIG. 5 is a stationary opto-electronic sensor 13 placed against the face of a wristwatch 14 which may be any one of the watches illustrated in FIGS. 1-4. Opto-electronic sensor 13 may be of the type including a matrix of fiber optic rods connected to an array of photo-sensitive diodes arranged to register with an entire pattern of code as shown in the watches of FIGS. 3 and 4, or it may comprise a single opto-electronic photosensitive element designed to register with the single passive display 1 in FIG. 1 or the single active LED element 6 in FIG. 2. A comparator 15 stores an acceptable code pattern and when it matches with the code transmitted by watch 14, a switch 16 is closed to actuate a device 17. For example, comparator 15 may contain a code permitting operation of a copying machine, or might contain a code permitting access to a bank lock box, and so forth. Similar opto-electronic and comparator equipment is manufactured by Recognition Systems, Inc. using laser light beams which detect a light and dark pattern, conduct the image to a photosensor. The image is converted to a computer signal which is then matched by the computer against stored data. Laser based device using photosensors are also used in optical bar code readers and are commercially available.

FIG. 6 is a watch 18 employed in conjunction with an opto-electronic wand 19 connected to a portable data recorder 20. The wand and data recorder are commercially available for reading bar codes of various standard types, for example, a CI portable code processor (PCP-2) produced by Computer Identics Corporation, Westwood, Massachusetts. The wand may be used in conjunction with the watches of FIGS. 1-3.

FIG. 7 is a watch 21 used as a transmitter of an electro-optic code to a reader comparator 22 in a door lock. Transmission of the proper "key" will cause an electric actuator 23 to open the lock 24. The lock and actuator may be similar to the optically actuated lock in the aforementioned Roe U.S. Pat. No. 3,845,362. Electronic comparison of the entered code may employ a coded access system as described in "Microprocessors, Design and Applications" by A. Veronis, Reston Publishing Company, Inc.

The details of the electro-optic sensors, comparators and actuators of FIGS. 5-7 are not material to the present invention, except that they are designed by known techniques to detect between either of two optical states of the electro-optic display, in the case of an "active" element detecting a light or no light and, in the case of a passive element, detecting either the presence of a light or dark image.

Referring to FIG. 8 of the drawing, the watch of FIG. 1 includes some con-ventional elements comprising quartz crystal 30, together with oscillator 31 to provide a timebase of high frequency pulses on the order of 32K Hz, a count-down divider 32 of CMOS flip-flops which reduce the frequency of the pulses to 1 Hz timed pulses on line 33.

Means for storing time information comprises a "seconds" counter 34, "minutes" counter 35 and an "hours" counter 36. These normally are divided into "units" and "tens" counters for each time dimension and supplying a binary coded decimal (BCD) output over the busses 37, 38, 39, each carrying 8 bits of information (four bits for units and four bits for tens). Alternative types of timekeeping storage would be to store variable information in a RAM according to the aforementioned Bayliss patent.

Outputs from counters 34–36 are connected to BCD-to-7 segment decoder drivers 40, 41, 42, which, in turn, are connected to contact terminals for the segments making up digits, such as 43 on the display 44.

The data from seconds counter 34 to decoder driver 40 flows through a solid state multiplexer switch 45 which provides an alternate supply of BCD data to decoder driver 40 via bus 46 when a signal is applied to the control lead 47. Lead 47 is connected to the output of an OR 63 which has all of its inputs connected to the code select data outputs.

In accordance with the present invention, the low frequency output from countdown divider 32 is connected to an AND 50 the other input of which is connected to a "select" switch 49. The output of the AND is connected to a code select device 51 which is advanced in step-wise fashion to provide a sequence of BCD identification code addresses to a programmable read only memory (PROM) 52 by means of input bus 53 carrying an address. Preferably this is a 4 bit address (providing 10 separate code addresses) but may be an 8 bit address providing 100 separate addresses.

The output of PROM 52 is connected via data bus 54 to a parallel input serial output register 55. The output data from register 55 controls a conventional single element display driver 56 whose output is connected to terminals on the display controlling a pair of segments which activate the electro-optic display portion 1 (see FIG. 1). Clocking of the register 55 is effected by means of an AND 57, one input of which is connected to an intermediate frequency tap on divider 32 and the other input to a "transmit" switch 58. A counter 59 counts the clocking pulses from AND 57 to register 55 and resets the code select device 51 after a pre-selected number of pulses.

The aforementioned elements are all of conventional design. Decoder drivers 40–42 may be Type 4543 CMOS devices, register 55 may be a group of parallel input CMOS 8 stage static shift registers, counter 59 a Type 4020 14 bit binary counter.

The PROM 52 is preferably a MOS-FET electrically programmable read only memory addressed only via a "row" decoder and reading out a binary code via the "column" leads. The preferred memory element is a silicon gate MOS-FET which is programmed by applying a high junction voltage (in excess of 30 volts for a P channel device) resulting in avalanche injection of electrodes to the floating gate. This gate can be restored by illuminating with ultra violet light, erasing the entire PROM array. However, the invention also contemplates that part of the PROM cannot be erased. This part may employ a fuse of polycrystalline silicon for each cell which is "blown" by the programming high voltage.

Figure 9:
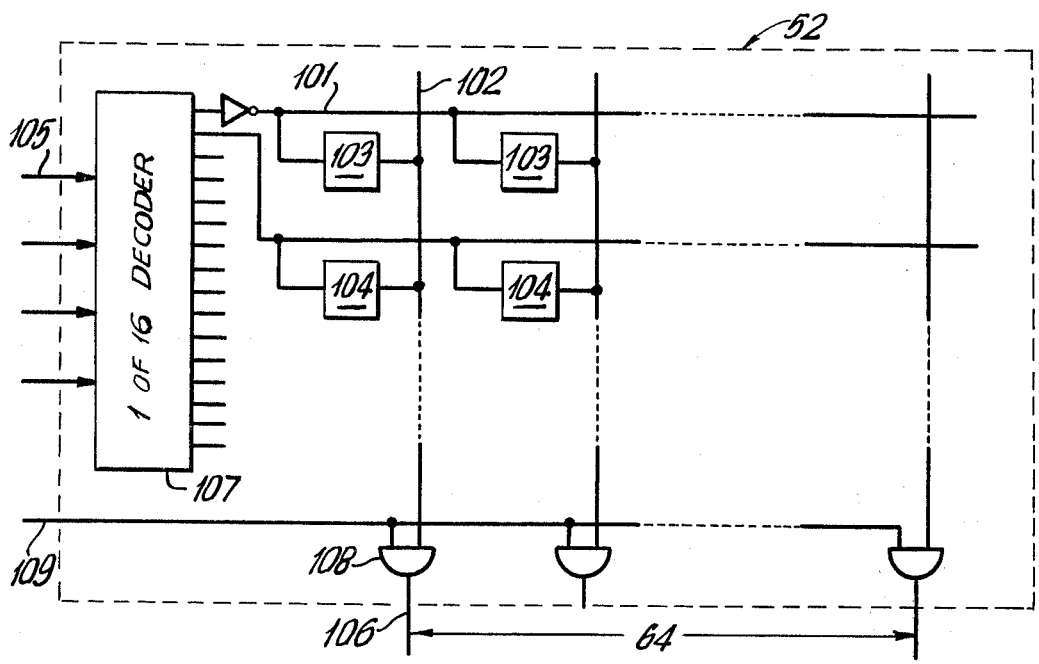
FIG. 9 is a simplified circuit logic diagram of one type of PROM preferred for the FIG. 8 timpiece.

FIG. 9 illustrates a 1K PROM 52 with "X" lines 101 and "Y" lines 102 inter-connected by memory cells 103, 104 which either provide a conductive path or not between modes. Input to the PROM 52 is a BCD address over 4 data lines 105 (part of bus 53) and output over 64 leads 106 (bus 54). Input is decoded by decoder 107 into 16 "X" inputs, only 10 of which are required by the BCD address, leaving 6 addresses for other purposes. Output is enabled by AND gates 108 clocked by a signal on lead 109.

Figure 9A:
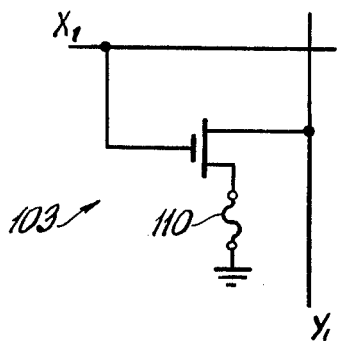
Figure 9B:
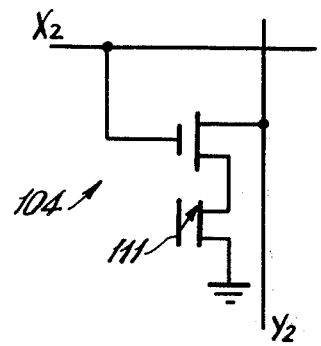

One type of memory cell 103 is permanently programmable, located at least at one address 0,0,—0. A suitable cell 103 is shown in FIG. 9a. A polycrystalline silicon fuse 110 is blown during the programming. Another type of memory cell 104 is shown in FIG. 9b. This includes a floating gate FET which is constructed and programmed as fully described in U.S. Pat. No. 3,744,036 issued to Frohman-Bentchowsky on July 3, 1973. This type of memory cell may be erased.

Figure 10:
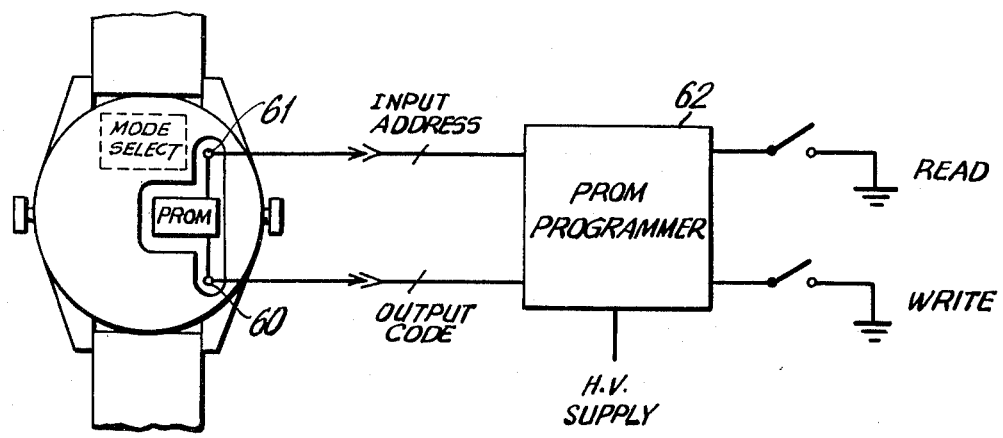
FIG. 10 is a reverse view of the watch shown in FIG. 1, illustrating the PROM programming apparatus.

Although the PROM illustrated uses only 16 addresses and provides a large 64 bit binary code word at the output (which is adequate for a 7character code in Code 39 or for a 9 character UPC code), any desired PROM arrangement may be employed. For example, a decoder output may be used and the PROM may store codes for all Code 39 alpha numeric characters and sequentially output each character in turn to the register 55. The PROM 52, although contained internally in the watch is arranged to be programmed externally. Reference to FIG. 10 illustrates a watch with two terminals 60, 61 exposed by removal of a cover. Also the PROM itself is exposed when the cover is removed for erasure, if desired, of the stored data by means of U.V. radiation. A PROM programmer 62 is utilized to read successive address input to the PROM and to program a corresponding output code. The PROM is programmed to store a plurality of binary identification codes at the output corresponding to a plurality of addresses at the input, using techniques outlined, for example, in PROM User's Guide, published by Pro-Log Corporation in (1977), or in "Microprocessors: Design and Applications" by A. Veronis, Reston Publishing Co. (1978), which are incorporated herein by reference.

In accordance with one aspect of the present invention, at the initial address PROM address 0,0,—0, a different and permanent binary code is programmed at the factory which is unique to each watch, thereby providing a unique "device" code. However, the PROM also has memory cells of the type which are erasable by UV light and is located in the watch as indicated in FIG. 10 so that all of the codes may be erased when the cover is removed for this purpose, except for the device code.

The code select device 51 shown in FIG. 8 is a modulo 10 BCD counter suitable for driving decoder driver 40. All of the output leads from the counter are also connected to an OR 63 whose output is connected to the switch 45.

Operation of the device of FIG. 8 is as follows. Normally the code select device 51 is in a reset condition with a zero count (code address) input connected to PROM 52. The corresponding device identification code is contained in register 55. Closing transmit switch 58 while the watch display 1 is aligned with the opto-electronic scanner causes a succession of high frequency pulses to clock register 55 for serial output of 64 binary bits to driver 56 causing electro-optic display 1 to alternate between light and dark in accordance with the binary code contained in register 55. As previously indicated, this code is unique to the device, being programmed in the PROM at address 0,0—0. Solid state switch 45 is not actuated since all of the outputs of mode select 51 or OR 63 are "0."

In order to select a particular code, for example a charge account number or a social security number, the select switch is depressed. BCD counter 51 starts to count at a 1 Hz rate. Since all of the outputs are connected to the OR 63, any signal from the counter actuates the solid state multiplexer switch 45. This causes the output of the code select 51 to be transferred to the decoder driver. A digital sequencing of the "units" display of what was previously the "seconds" indicator commences. The sequential BCD output of code select 51 also serves as sequential addressing of the PROM 52, sequentially entering corresponding codes in register 55. When the desired number of code is reached, for example, "08" signifying a bank account number, the select switch is released. The opto-electronic reader or wand is placed in alignment again with electro-optic display portion 1 on the watch. Then the transmit switch 58 is depressed causing the contents of register 55 to be serially transmitted to driver 56 which causes the electro-optic display 1 to turn off or on rapidly at a higher clocking frequency determined by the intermediate tap from countdown divider 32.

In accordance with the present invention, the code transmissions from the electro-optic portion of the display may, if desired, correspond to standard bar codes so that they may be read by existing scanners with ease. Typical bar codes appear in FIGS. 11, 12 of the drawing. FIG. 11 shows Code 39 which is an alpha-numeric code used in industrial product coding and consisting of narrow bars, narrow spaces, wide bars and wide spaces. The wide bars and spaces are three times the width of the narrow. Each character is made up of 9 binary bits and 3 of the 9 bits are binary 1's. Binary 1's are represented by wide bars or spaces and binary 0's are represented by narrow bars or spaces. FIG. 12 shows the more familiar UPC code, which is a numeric code used on food products primarily. This code generally consists of 10 numeric characters, one character requiring 7 binary bits of information. Dark elements represent 1's while light elements represent 0's.

It should be noted that, in the FIG. 8 form of the invention, the bar code is fed in a time sequence series of light and dark electro-optic states. Therefore the wand, rather than being drawn across a series of light and dark printed patterns is held stationary, and the light and dark patterns are presented in time sequence to the wand or other type of opto-electronic reader.

Reference to FIGS. 13a and 13b of the drawing show two successive UPC characters each to consist of 7 binary elements. For example, the first character shows a dark narrow stripe 65 and the 4th through 7th elements together make up a wide stripe 66. It will be apparent that the same information is presented in time sequenced fashion by activating an electro-optic element according to the wave shapes shown in FIG. 13b thereby modulating the display between two optical states of "dark" and "light." This modulation is performed in accordance with the binary code in FIG. 13c transmitted from the PROM. Here the 1's serve to activate the display and the 0's serve to inactivate the display. A liquid crystal display is limited in speed of "turn on" and "turn off" times to rates on the order of 50–200 milliseconds. At a rate of 100 milliseconds, this requires 6.4 seconds to transmit a 9 digit UPC code.

MODIFICATION—QA WATCH

Figure 14:
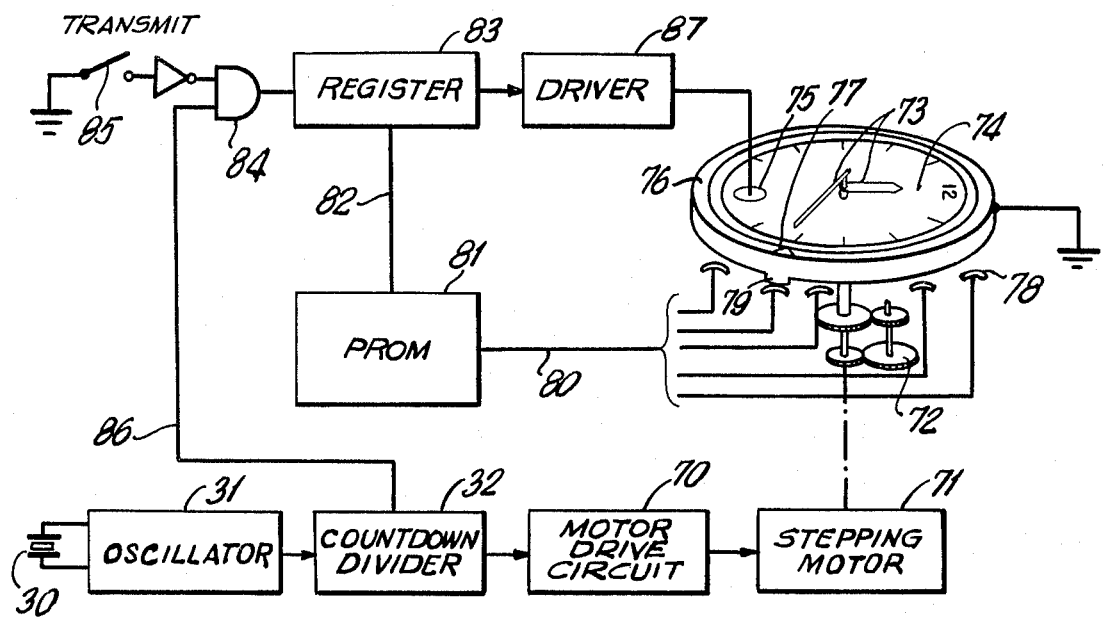
FIGS. 14, 15 and 16 are simplified schematic diagrams for the circuit logic associated with the watches of FIGS. 2, 3 and 4 respectively.

Referring now to FIG. 14 of the drawing, a modification of the invention is utilized in a quartz analog watch shown in FIG. 2. The schematic diagram of such a watch is illustrated in FIG. 14 to comprise quartz crystal, oscillator and countdown divider 30, 31, 32 which may be the same as those previously described. However, the output from the countdown divider actuates motor drive circuit 70 which provides pulses to a stepping motor 71. The motor is advanced in steps to drive a gear train 72 serving as time information storage means, i.e. a mechanical memory, which is periodically advanced to keep the time. The gear train 72 rotates hands 73 to show the time on a conventional dial 74.

In accordance with the present invention, the timepiece display which here comprises hands 73 and dial 74 further includes an electro-optic display portion 75, which is a small LED, although it could also be a small LCD, EC or other type of electro-optic device capable of assuming 2 optical states. The timepiece further includes a manually rotatable code select ring 76 which is provided with an indicating marker 77 and a number of electrical contacts circumferentially disposed around the ring and contacted by a protrusion 79 beneath indicator marker 77. Similar rotatable rings for a selector of numerical inputs and functions in a calculator watch have been suggested in the aforementioned Sandstedt patent and U.S. Pat. No. 4,019,037 issued Apr. 19, 1977 to Monna, but used in connection with a digital display for a different purpose. Ring 76 is electrically grounded to the watch case and the circumferentially disposed contacts 78 are connected over a data bus 80 to a PROM 81. The output of the PROM is connected over a data bus 82 to a parallel input, serial output register 83. The register 83 is clocked by the output from an AND 84 having one input connected to a transmit switch 85 and the other to an intermediate frequency tap 86 from divider 32. The output from register 83 is connected to LED driver 87.

The PROM 81, register 83, may be similar to those previously described in connection with FIG. 8. Since only one lead of the data bus 80 is grounded at a time, the leads may be led through suitable buffer inverters to the "X" lines of the PROM without decoding.

The operation of FIG. 14 is as follows: selection of a desired identification code is made by rotating the ring 76 until the indicated marker is opposite a selected portion of the timepiece dial. This can be inscribed on the dial or known only to the user. Closure of one of the contacts 78 selects an address for PROM 81 which causes an output binary code to be "jammed" in parallel into register 83. Subsequently, the transmit switch 85 is closed and pulses from the AND 84 cause a string of binary 1's and 0's to actuate driver 87 which causes the LED 75 to emit a series of time sequenced electro-optic signals to the opto-electronic reader. Use of an LED provides a much faster transmission of data than is possible with an LCD at the present state of the art. Therefore, it may be beneficial to use an LED rather than an LCD in a QA watch which does not already incorporate an LCD for time indication.

Figure 19:
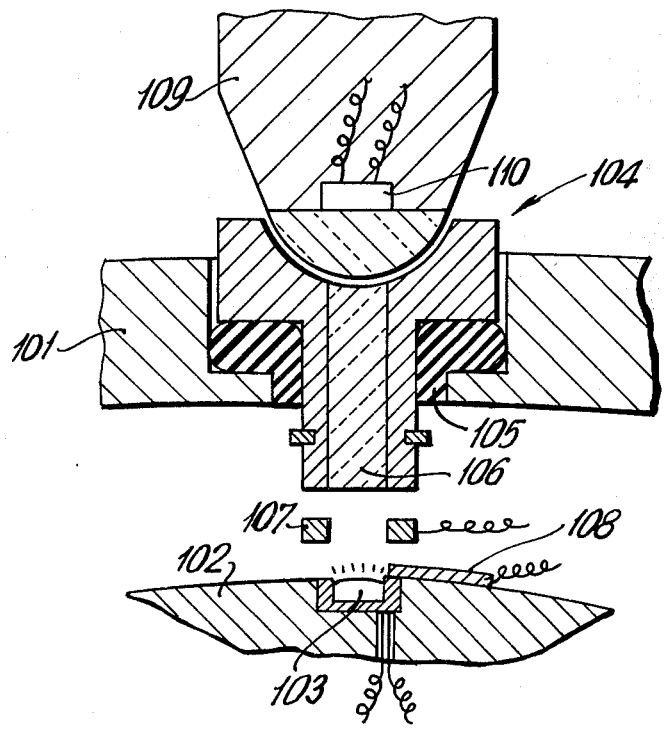
FIG. 19 is an enlarged cross-sectional view of an alternate push button and electro-optic device utilized in the invention.

Although the LED is located on the watch dial in FIG. 2, it can also be located elsewhere on the timepiece and can be incorporated in the transmit switch as shown in FIG. 19. There a watch case 101 contains a watch module 102 with an LED electro-optic portion 103 aligned with a push button 104. The push button 104 is sealed and returned by gasket 105 and has a light transmitting central portion 106. A spring switch blade 107 is hollow and contacts terminal 108 when depressed. Contacts between 107 and 108 serve as the transmit switch 85. The wand 109 and photosensitive element 110 serve to depress the push button and close the transmit switch. The LED 109 will be read by the wand 109 while the push button 104 remains depressed.

MODIFICATION—BAR CODE DISPLAY

Figure 15:
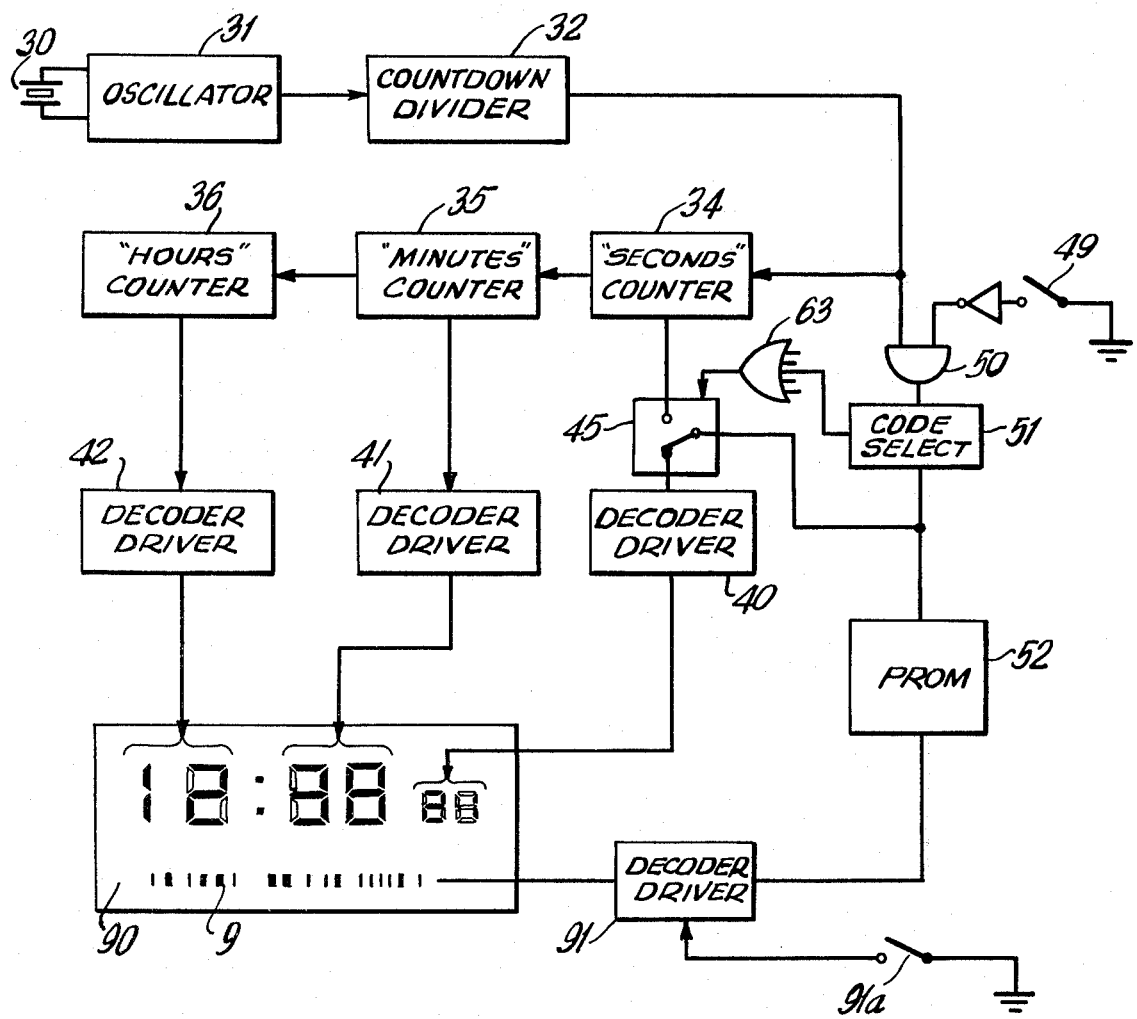

The above-described arrangements contemplate a stationary opto-electronic scanner. However, a movable wand may be employed if desired to speed up data transmission by utilizing a special section on the electro-optic display, as will be described in connection with FIG. 15, corresponding to the watch of FIG. 3. This provides a much faster readout of a bar code when a slower reacting display type is used.

Quartz crystal 30, oscillator 31 and divider 32 are employed as before to provide a timebase for providing timed pulses to the seconds, minutes and hours counters 34, 35, 36 supplying decoder drivers 40, 41, 42. As before, the "seconds" portion of the display is utilized for also indicating the selected code. A solid state multiplexer switch 45 is switched by the output from the OR device 63 whenever there is an address on the output of the code select device 51 which does not comprise all 0's. The code select device 51 is a BCD counter as before which is advanced by the output from AND 50, and the output from code select 51 is connected to a PROM 52. The foregoing elements in FIG. 15 function in the same manner as in FIG. 8 previously described, where they have the same reference number.

However the display itself indicated at reference 90 differs by incorporating a special bar code section 9. This is a strip of parallel segments individually led out to contact terminals and connected to the output of a transmission gate decoder driver 91 whose input is connected to the output of PROM 52. A binary number presented at the input of decoder driver 91 will simply actuate the transmission gates when enabled by switch 91a, providing a corresponding energizing or non-energizing of all segments on the display. Thus information in a binary coded machine-readable format is visually displayed as a bar code on the timepiece display which corresponds to the numerical code selection also displayed in digital form in place of the "seconds" digit.

Figure 17:
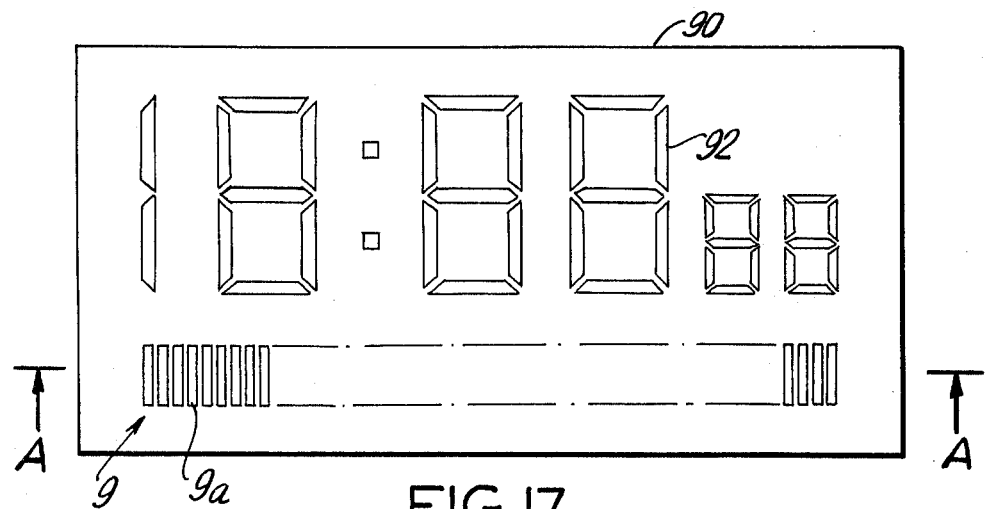
FIGS. 17 and 18 are plan and cross sectional views respectively of a display for both digits and bar code.
Figure 18:
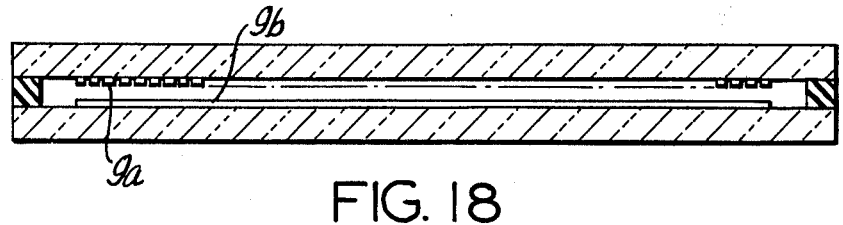

Reference to FIGS. 17 and 18 illustrate a display for presenting an electro-optic bar code on the same display which indicates the time. The display pattern is illustrated in FIG. 17 plan view to comprise conventional digits 92 disposed above a bar code display 9. The bar code display comprises a series of closely spaced electrodes 9a.

The cross-section of FIG. 18 taken through the display along lines AA of FIG. 17 show the arrangement of upper and lower electrodes on the upper and lower display substrates. Common electrode 9b is disposed on the lower substrate. The display may be of any electro-optic type, and if the display 90 is a liquid crystal display of the twisted nematic type, polarizer sheets (not shown) are also required. The drawings of FIG. 17 and 18 are not to scale, since the bar segments are very closely spaced and as small as possible in order to provide the maximum information on the display. A wand stroked across the electro-optic bar code pattern will read the pattern in the conventional way.

MODIFICATION—RANDOM SEGMENT PATTERN

Figure 16:
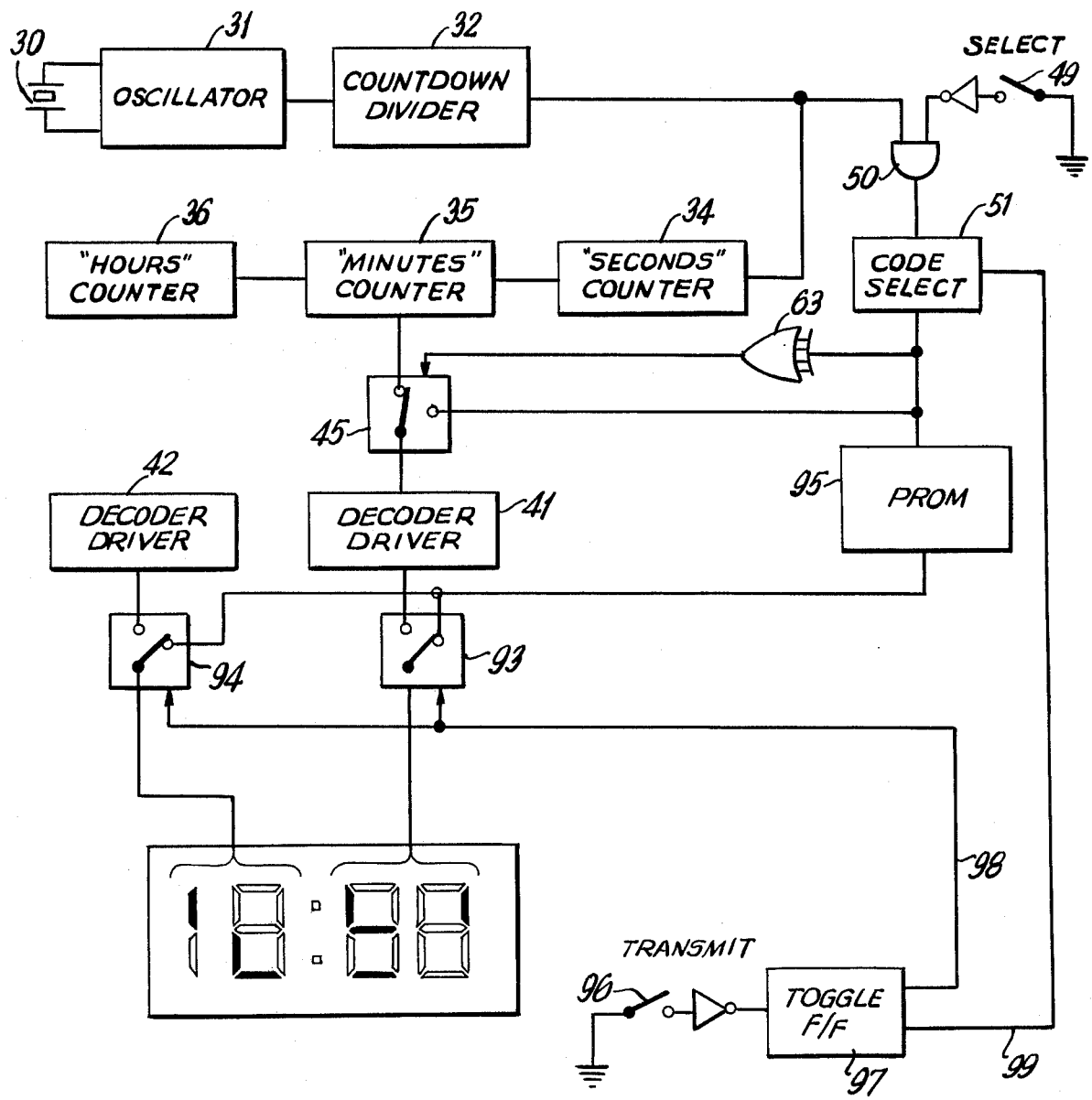

FIG. 16 illustrates yet another embodiment of the invention, corresponding to the watch shown in FIG. 4. The code is displayed all at once, but in a random segment pattern rather than in bar code format. The quartz crystal, oscillator, countdown divider, seconds counter, minutes counter, hours counter, decoder drivers, AND, OR, and code selector are designated by the same reference numerals 30, 31, 32, 34, 35, 36, 41, 42, 50, 63, 51 respectively as before. Solid state switch 45, however, is interposed between the output of the minute counter 35 and the decoder driver 41. Additional solid state multiplexer switches 93, 94 are connected between the decoder drivers 41, 42 respectively and the display terminals. The alternate terminals for the switches 93, 94 are connected to the output bus of a PROM 95.

A transmit switch 96 is connected to a toggle flip-flop 97. One output from the flip-flop 97 is connected to a line 98 which, when high, causes switches 94, 95 to transfer to the output data bus of PROM 95 as shown in the drawing. The other output from flip-flop 97 is connected to a lead 99 which is connected to the reset of code select 51. PROM 95 has a number of output leads corresponding to the number of electro-optic segments accessed through switches 93, 94, here 23 segments for the 3½ digits (excluding the colon markers).

Operation of the device shown in FIG. 16 is as follows. The electro-optic display, normally presenting intelligible time-indicating digits, is employed alternatively to display a binary code random segment pattern using the same segments as those used to display digits. The pattern is not decoded and is unintelligible except to the opto-electric scanner and comparator, which has the identical pattern available or stored in it. The 3½ digit display with a colon marker illustrated has 23 separately actuable segments. This presents the possibility of $2^{23}$ combinations. This represents over 8 million unique codes, presenting the possibility of a device code unique to each timepiece for all practical purposes. Of course a six digit display would provide a much larger number of unique codes.

Normally the code select counter 51 is in a reset condition and an output of 0's serves as an address for PROM 95. PROM 95 is uniquely programmed at the factory so that each device has a different output for address 0,0,—0, as previously described. This code is transmitted using switch 96.

A second selectable binary code is selected by actuating the select switch 49 and advancing counter 51 at a 1 Hz rate. OR 63 transfers the output of code selector 51 to the decoder driver 41 by operating switch 45. Therefore, the code selection is displayed on the "minutes" display.

When it is desired to transmmit the code pattern to the opto-electric scanner, transmit switch 96 is depressed to toggle the flip-flop 97. This activates switches 93, 94 to the position indicated and causes the PROM 95 to activate the pattern of digits corresponding to the selected code without decoding with the normal decoder drivers 41, 42. Therefore, the first display pattern is a code unique to the device, and a second pattern is selected by the user.

It will be apparent that prior to transmission and after transmission the timepiece is also displaying a pattern corresponding to a unique time. A "time lock" feature will enable additional security, and the scanner may be adapted to "read" three successive patterns of codes shown on the display. In this manner, three subsequent code patterns are transmitted which are (1) unique to the device, (2) selected by the user and (3) indicative of the time. A secure system with ability to indicate the time of transmission of the code is enabled by this modification.

Thus there has been described an improved combination timepiece and electro-optical identification device utilizing a memory in the timepiece to store a plurality of identification codes and to selectively transmit the code to an opto-electronic scanning device. The code selected by the user is selected and displayed on the timepiece display, either as a single binary coded pattern or in a time sequence of binary coded optical variations. Although the selection of codes and transmission is made herein using a manually actuated switch, other types of actuating switches, including those closed by radio signals, light signals, etc., may also be employed.

Other modifications will occur to those skilled in the art and it is desired to secure in the appended claims all such modifications as fall within the true spirit and scope of the invention.

What is claimed is:

1. In an electronic timepiece of the type having a timebase including an oscillator and countdown divider providing timing pulses, timekeeping means connected to said divider and periodically advanced by said pulses to keep time and to store time information, and display means connected to said timekeeping means and adapted to visually display the time, the improvement comprising:

an electro-optic portion on said timepiece actuable between at least two optical states wherein said electro-optic portion comprises a section of closely spaced, parallel, separately actuatable segments;

memory means inside the timepiece storing a plurality of identification codes in binary form;

means for selecting one of said identification codes to be transmitted and indicating the selection on said display means; and means for selectively transferring at least one selected identification code from said memory means to said electro-optic display portion and optically displaying said code in machine-readable binary form on the electro-optic display portion so that the codes stored in said memory means separately actuate the segments in a bar code format adapted to be read by moving an opto-electronic scanner past the segments.

2. In an electronic timepiece of the type having a timebase including an oscillator and countdown divider providing timing pulses, timekeeping means connected to said divider and periodically advanced by said pulses to keep time and to store time information, and display means connected to said timekeeping means and adapted to visually display the time, the improvement comprising:

an electro-optic portion on said timepiece actuatable between at least two optical states said electro-optic portion comprising the same segments which are normally supplied with decoded BCD signals to make up digits on said display means;

memory means inside the timepiece storing a plurality of identification codes in binary form;

means for selecting one of said identification codes to be transmitted and indicating the selection on said display means; and means for selectively transferring at least one selected identification code from said memory means to said electro-optic display portion and optically displaying said code in machine-readable binary form on the electro-optic display portion in a random segment pattern without decoding, whereby said selected code may be read by an opto-electronic sensor.

3. In an electronic timepiece of the type having a timebase including an oscillator and countdown divider providing timing pulses, timekeeping means connected to said divider and periodically advanced by said pulses to keep time and to store time information, and display means connected to said timekeeping means and adapted to visually display the time, the improvement comprising:

an electro-optic portion on said timepiece actuatable between at least two optical states;

a display decoder actuated by said timekeeping means with a BCD signal;

memory means inside the timepiece storing a plurality of identification codes in binary form;

means for selecting one of said identification codes to be transmitted and indicating the selection on said display means, said code selection means comprising a BCD counter, and including a switch responsive to said counter for transferring the counter output to the display decoder, whereby the selected code is displayed using at least one digit which is also used to display the time; and means for selectively transferring at least one selected identification code from said memory means to said electro-optic display portion and optically displaying said code in machine-readable binary form on the electro-optic display portion whereby said selected code may be read by an opto-electronic sensor.

4. In an electronic timepiece of the type having a timebase including an oscillator and countdown divider providing timing pulses, timekeeping means connected to said divider and periodically advanced by said pulses to keep time and to store time information, and display means connected to said timekeeping means and adapted to visually display the time, the improvement comprising:

an electro-optic portion on said timepiece actuatable between at least two optical states;

memory means inside the timepiece storing a plurality of identification codes in binary form;

means for selecting one of said identification codes to be transmitted and indicating the selection on said display means, wherein said divider means is connected to advance the code selection means in response to said timing pulses to provide a sequential choice of code selections and is also connected to an AND circuit together with a manually actuated switch to transmit the selected code by varying the optical states on the electro-optic portion at a higher frequency; and means for selectively transferring at least one selected identification code from said memory means to said electro-optic display portion and optically displaying said code in machine-readable binary form on the electro-optic display portion whereby said selected code may be read by an opto-electronic sensor.

5. In an electronic timepiece of the type having a timebase including an oscillator and countdown divider providing timing pulses, timekeeping means connected to said divider and periodically advanced by said pulses to keep time and to store time information, and display means connected to said timekeeping means and adapted to visually display the time, the improvement comprising:

an electro-optic portion on said timepiece actuatable between at least two optical states, said electro-optic portion being disposed inside the timepiece;

memory means inside the timepiece storing a plurality of identification codes in binary form;

means for selecting one of said identification codes to be transmitted and indicating the selection on said display means; and means for selectively transferring at least one selected identification code from said memory means to said electro-optic portion and optically displaying said code in machine-readable binary form on the electro-optic portion whereby said selected code may be read by an opto-electronic sensor, said code transferring means including a push button switch having a light transmitting section operatively associated with the electro-optic portion to facilitate reading the electro-optic portion outside the timepiece when transmitting a code.

6. The combination according to claim 5, wherein the pushbutton switch is connected to initiate code transfer via the light-transmitting section when the push button is depressed.

* * * * *